April 8, 1947.                    F. H. NADIG ET AL                    2,418,786
                              HYDRAULIC INTERFEROMETER
                              Filed Oct. 16, 1943                    2 Sheets-Sheet 2
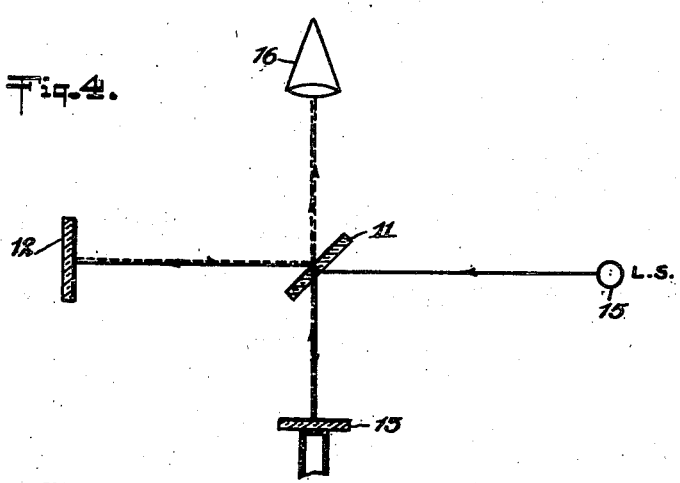
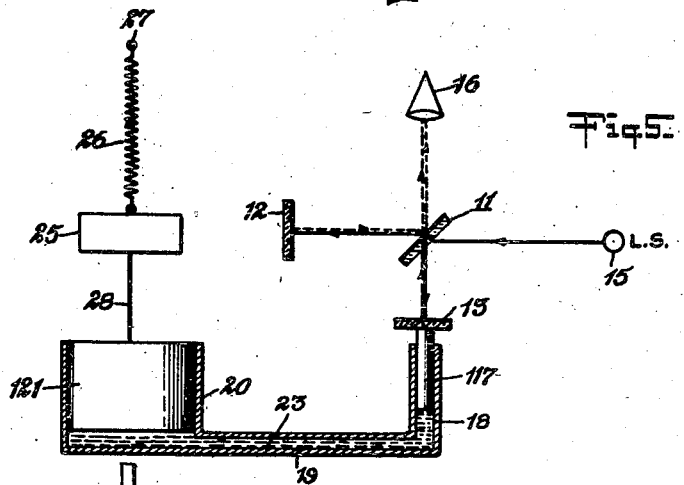
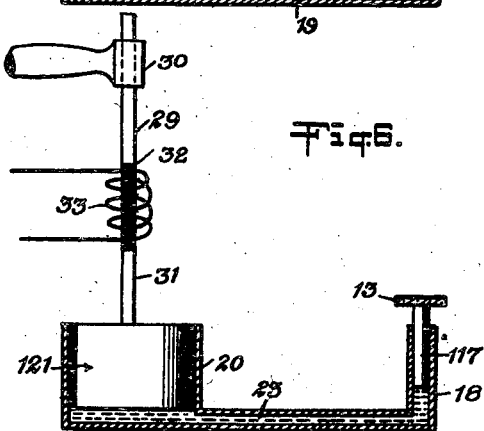
INVENTORS
Francis H. Nadig
and Jacob L. Bohn
BY
Attorneys Patented Apr. 8, 1947

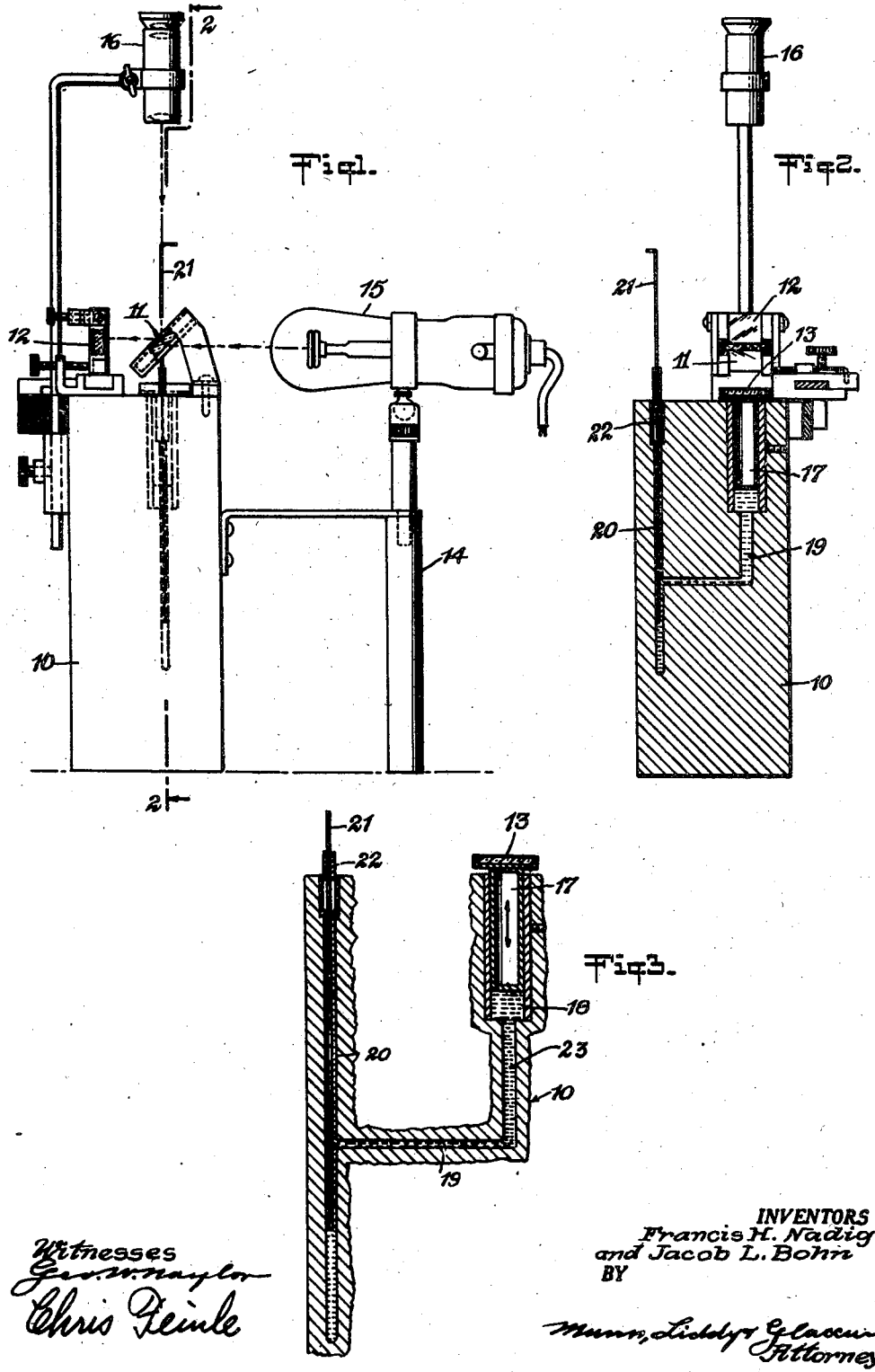

2,418,786

UNITED STATES PATENT OFFICE 2,418,786

HYDRAULIC INTERFEROMETER

Francis H. Nadig, Philadelphia, and Jacob L. Bohn, Glenside, Pa.

Application October 16, 1943, Serial No. 506,514

5 Claims. (Cl. 88—14)

This invention relates to an instrument for measuring light waves, variance in length of certain substances and earth tides, manifested in optical interference.

More particularly, the invention relates to improvements in instruments, such as the Michelson interferometer.

An object of the invention is the provision of improved adjusting means in an instrument of the indicated character, whereby to measure more minute magnitudes with greater accuracy than hitherto.

The nature of the invention and its distinguishing features and advantages will appear when the following specification is read in connection with the accompanying drawings, in which—

Fig. 1 is a side view of an instrument embodying the features of the invention.

Fig. 2 is a sectional view taken on the line 2—2 of Fig. 1;

Fig. 3 is an enlarged fragmentary sectional view of the hydraulic actuating means.

Fig. 4 is a diagrammatic view illustrating the way the interference fringes are produced.

Fig. 5 illustrates the use of the instrument for measuring earth tides.

Fig. 6 illustrates the use of the instrument for observing and measuring small increments of length and other small displacements.

There is shown in the drawing a Michelson interferometer to which the present invention is applied by way of example. The instrument includes a base 10 on which are mounted the adjustable frames which support the reflectors consisting of the so-called "half-silvered" mirror 11, a vertical mirror 12, and a horizontal mirror 13. Attached to the base 10 is a bracket 14 which supports a neon lamp 15 which sends a light beam to the mirror 11. This incident light beam is divided by the mirror 11 into two rays which by virtue of the mirrors 12 and 13 are reversed so that there is a half a wave length of optical path difference between them, thereby producing the interference fringes or bands which may be seen in the telescope 16.

In accordance with the invention, hydraulic means is provided to move or adjust the mirror 13 with respect to the mirror 11, so that the surface of the former is always parallel to its original position, while its distance from the mirror 11 is altered, to cause the fringes or bands to shift across the field, to be counted as they move for a measuring operation. Said hydraulic means includes a piston 17 on the upper end of which the mirror 13 is mounted. The piston 17 is movable in a cylinder 18. A connecting conduit 19 connects the lower end of the cylinder 18 with a cylinder 20. An indicator plunger or piston 21 operates in the cylinder 20. The piston 21 is in the nature of a piece of wire. It has guided movement in a gland or bushing 22. A quantity of motion transmission liquid, such as mercury 23, fills the cylinders and the conduit connecting the same. The cylinder 20 extends below the conduit 19 in order to allow the wire 21 to have considerable movement in displacing the mercury to compel the upward movement of the piston 17 and the mirror 13 carried thereby. By withdrawing the wire plunger 21, the mercury recedes, thereby allowing the piston 17 and the mirror 13 to move downwardly. The mirror 13, therefore, is movable toward and away from the mirror 11 to alter the distance between them. The cylinders and transverse conduit connecting the same are formed in the base 10, but obviously these features may be incorporated in the instrument in any other practical manner for the intended purpose.

The movement of the mirror 13 with respect to the mirror 11 in one direction causes the interference fringes to contract or converge toward a center point, and the fringes expand or diverge from the center point when the mirror 13 is moved in the opposite direction. The fringes are counted as they move in measuring the length of a light wave as one of the uses of the instrument. The provision and arrangement of the means set forth make it possible to measure more minute magnitudes with greater accuracy than hitherto. This is true because of the great disparity in the respective displacement characteristics of the piston 17 and the plunger 21. A great movement of the plunger 21 causes a relatively infinitesmally small movement of the piston 17. By using a suitable scale, the distance the plunger 21 is moved may be readily ascertained.

The instrument can be used in several ways. Knowing the wave length of the light and counting the fringes the distance can be calculated. Knowing the distance mirror 13 is moved and counting the number of fringes, the wave length of the light can be calculated.

The following is a specific example of the use of the instrument to determine wave length of light.

As the plunger 21 is moved downwardly, it displaces some mercury, which in turn tends to go into cylinder 18, thus forcing the piston 17 and the mirror 13 carried thereby, upwardly. In the reverse operation, that is to say, when the plunger 21 is moved upwardly, the cylinder 18 loses some mercury and the piston 17 and its mirror 13 move downwardly under the action of gravity.

If the diameter of plunger 21 is .032 centimeter, then the radius of plunger 21 is .016 cm.=$r_2$. If the diameter of the piston 17 is 1.60 cms. then the radius of the piston 17 is .80 cm.=$r_1$. If the plunger 21 is moved downwardly 2.54 cms. then from the equation $$Y_1 = Y_2 \frac{r_2^2}{r_1^2} = 2.54 \times \frac{.000256}{.64}$$

$$Y_1 = 2.54 \times \frac{1}{2500} = .00101 \text{ cm.}$$

Therefore, when plunger 21 moved downwardly 2.54 cm. the piston 17 moved upwardly .00101 cm. This motion of plunger 21 can be measured directly by a ruler and the diameters of the piston 17 and plunger 21 can be measured with a micrometer caliper.

If now the number of fringes counted while the piston 17 was moving upwardly was 37, then from the equation $$\frac{M\lambda}{2} = d = Y_1$$

$$\lambda = \frac{2d}{M} = \frac{2 \times .00101}{37} = .0000546 \text{ cm.}$$

Thus the wave length of this particular light is .0000546 centimeter. Thus the hydraulic lever principle in an interferometer is used to reduce the applied motion in measuring the wave length of light. The motion is reduced to $$\frac{1}{2500}$$

of the applied motion.

If a plunger 21 of a diameter larger than that of the piston 17 is used, a downward movement of the plunger 21 will move the piston 17 upwardly a distance greater than the movement of the plunger 21 depending upon the respective diameters of said plunger and piston.

Suppose in the above case use is made of light .0000215 inch in wave length. To get 1 fringe shift, the mirror 13 must be moved .0000107 inch. This means that if a motion of .000000107 inch is applied to plunger 21 a 1 fringe shift will be obtained if the ratio of the diameters of the plunger and piston is 100 to 1. If a 1/10 of a fringe shift is observed, plunger 21 will have to be moved only .0000000107 inch. Thus a motion of approximately 1/100,000,000 of an inch may be detected. In this manner the instrument also may be used to detect small increments of length, or small decreases of length.

In Fig. 5 the interferometer is shown for measuring earth tides. In this case the hydraulic lever is used to amplify the motion of a plunger or piston 121 of relatively large diameter compared to that of the piston 117 which carries the mirror 13. In order to measure earth tides the variation of the acceleration due to gravity is ascertained. This is accomplished by attaching a weight 25 to the lower end of a coil spring 26 whose upper end is fixed as at 27. The weight 25 is connected with the piston 121 by a bar 28. Variations in the length of the spring 26 affect the hydraulic lever and such variation can be detected by the manifested optical interference.

To measure small increments of length, the instrument is in the form shown in Fig. 5 with the weight 25, spring 26 and bar 28 omitted. As shown by way of example in Fig. 6, a brass rod 29 is rigidly supported vertically as at 30. A second brass rod 31 rests vertically on the piston 121. An iron rod 32 is arranged between the rods 29 and 31 with its opposite ends in contact with the lower and upper ends respectively of the rods 29 and 31. A coil 33 surrounds the rod 32. When an electric current is passed through the coil 33, the iron rod 32 changes its length, causing the piston 121 to move accordingly. This motion may be observed and measured by the fringe shifts of the optical system of the instrument. Other small displacements may be applied to the piston 121 and be observed and measured by the shift of the fringes. By other small displacements is meant changes in the thickness of certain crystals due to the piezoelectric effect, changes in the length of certain metal rods due to the phenomenon of magnetostriction, and changes in the dimensions of materials due to small temperature variations.

By employing the hydraulic lever principle to move or adust one of the mirrors, a precision type of instrument may be produced at low cost, and one easy to maintain, particularly the type suitable for students.

We claim:

1. An interferometer comprising a light source, an eye-piece and means for reflecting the light from said source to said eye-piece in the form of interfering light beams, said reflecting means including a vertically movable horizontal mirror, a hydraulic system comprising connected cylinders of substantially different cross section, a piston in one cylinder carrying said movable mirror and a plunger adjustable in the other cylinder for effecting the movement of the piston.

2. An interferometer comprising a light source, an eye-piece and means for reflecting the light from said source to said eye-piece in the form of interfering light beams, said reflecting means including a vertically movable horizontal mirror, a hydraulic system comprising two connected cylinders of substantially different cross section, the smaller cylinder being of greater length, a piston in the larger cylinder carrying said movable mirror, and a plunger in the smaller cylinder the adjustment of which through a wide range of movement effects movement of the piston through a proportionately lesser range.

3. An interferometer comprising a light source, an eye-piece and means for reflecting the light from said source to said eye-piece in the form of interfering light beams, said reflecting means including a vertically movable horizontal mirror, a hydraulic system comprising two cylinders of substantially different cross section and length and a connecting passage communicating with the smaller cylinder at a mid point, a piston in the larger cylinder carrying said movable mirror and a plunger movable longitudinally in the liquid column of the smaller cylinder serving to displace small quantities thereof by a relatively large movement of the plunger and effect a proportionally smaller movement of the piston in the larger cylinder.

4. An interferometer comprising a light source, an eye-piece and means for reflecting the light from said source to said eye-piece in the form of interfering light beams, said reflecting means including a vertically movable horizontal mirror, two connected mercury columns of substantially different cross section forming a hydraulic system, a piston actuated by the larger column and carrying the movable mirror, a plunger adjustable longitudinally in the smaller column through a wide range of movement and serving to displace the mercury in the larger column to effect proportionately small movements of the piston.

5. An interferometer comprising a light source, an eye-piece and means for reflecting the light from said source to said eye-piece in the form of interfering light beams, said reflecting means including a vertically movable horizontal mirror, a hydraulic system composed of two intercommunicating cylinders of substantially different cross section open at their upper ends and containing suitable liquid, and a piston in one of the cylinders carrying the movable mirror.

FRANCIS H. NADIG.
JACOB L. BOHN.

REFERENCES CITED

The following references are of record in the file of this patent:

UNITED STATES PATENTS

| Number | Name | Date |
| --- | --- | --- |
| 1,044,502 | Crehore et al. | Nov. 19, 1912 |

FOREIGN PATENTS

| Number | Country | Date |
| --- | --- | --- |
| 389,417 | France | June 27, 1908 |
| 486,694 | Britain | June 9, 1938 |